Aug. 10, 1937.                A. W. KEUFFEL ET AL                2,089,209
                                MEASURING TAPE
                              Filed Sept. 19, 1933
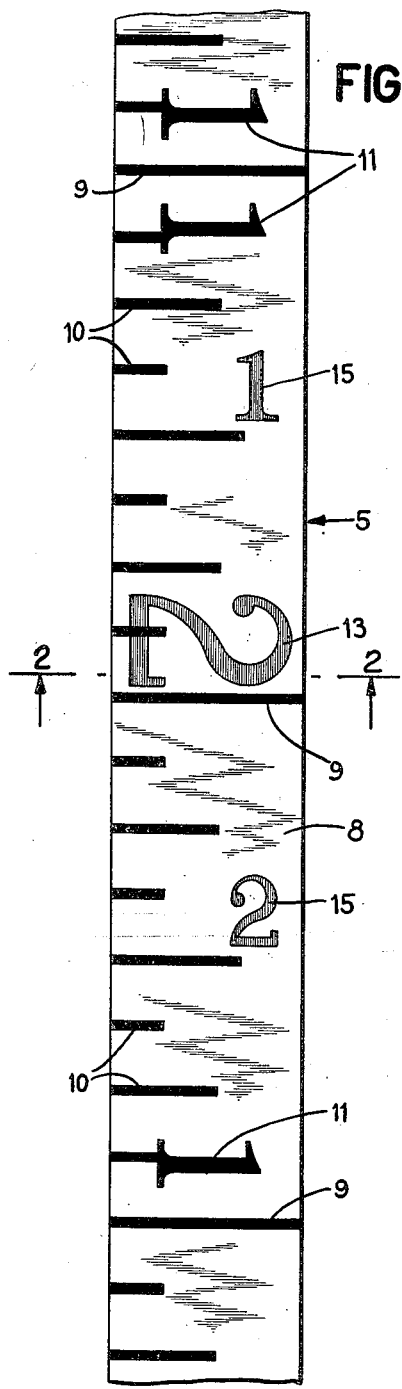
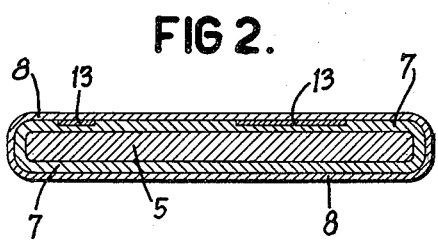
INVENTORS
ADOLF W. KEUFFEL
WALTER GOTHAM
ATTORNEY Patented Aug. 10, 1937

2,089,209

UNITED STATES PATENT OFFICE 2,089,209

MEASURING TAPE

Adolf W. Keuffel, Montclair, and Walter Gotham, Elizabeth, N. J., assignors to Keuffel & Esser Co., Hoboken, N. J., a corporation of New Jersey Application September 19, 1933, Serial No. 690,064

17 Claims. (Cl. 91—67.9)

This invention relates to measuring tapes, rules and other scales of the kind used by engineers and surveyors, also carpenters, builders, carpet layers and others to measure distances, either horizontal or vertical, although not so limited. This invention is particularly suitable for a steel measuring tape.

Heretofore, measuring tapes have been made either of woven fabric or of a ribbon of steel. Fabric tapes are apt to be inaccurate since they stretch in use and are soon worn out if subjected to hard usage. Steel tapes are preferred but their surface soon becomes worn and rusty rendering the markings thereon difficult to read, especially out of doors and in darkened localities, because of the lack of contrast between characters and background. Moreover, the numerals and subdivisions of the scale representing units of lineal measure and fractions thereof have heretofore been created by an etching process on the surface of the steel tape. To create the markings on the steel tape by means of etching, the superficial structure or background of the steel is eaten away by an acid while portions of the surface are protected against the acid to form the markings of scale and numerals. The etching of the background along the longer subdivisions of the scale and such numerals as "1" and "4" weakens the tape in a transverse line extending substantially wholly across the tape alongside of a relatively thicker portion forming, in effect, a rigid bar. After such a tape has been in use and has become oxidized, the etched portions are further weakened and, upon bending, frequently break at such a subdivision so that patching or repairing of broken tapes is a frequent necessity. It is not only difficult to repair a steel tape and maintain its true length, but where the repairs have been made, the markings on the surface of the tape are obliterated.

It has heretofore been proposed to avoid the weakening of the metal through etching, by electro-plating markings and/or background on the steel tape as a base. The metal used in the electro-plating has usually been nickel and an attempt at contrast has been made by employing bright and black nickel. Experience has shown, however, that such nickel deposit offers practically no contrast. Thus there has been presented all of the objections sought to be avoided and processes have been involved which are both costly and complicated.

This application is a continuation in part of United States Serial No. 641,034, filed November 3, 1932.

The present invention has for its objects to avoid the weakening of a steel tape by etching; to protect the surface of a flexible or inflexible metal strip against corrosion; to afford a contrast between the background and the markings as an aid to reading the scale in darkened localities; to permit of a contrast between the markings of, say, units and fractions of units of linear measure in the interest of a celerity of reading and to protect the markings.

In carrying the invention into effect, it is preferred to coat the surface of a flexible or inflexible metal ribbon or strip, for instance, a steel tape with a coating or film of preferably a light or light reflecting color, such as white. Hereinafter all such flexible or inflexible metal strips, which may be steel, brass or any other suitable metallic material and which have a scale or scales on a surface thereof, will be referred to, for convenience, as tapes. The invention will be described with respect to a steel tape but it is to be understood that it is equally applicable to a flexible or inflexible ribbon or bar of any metallic material, referred to herein generically as a metallic strip.

The strip is coated upon both the upper and lower surfaces and along both edges with a protective film of such composition that when hardened or dried will retain suitable flexible characteristics, it being found that such a complete sheath around a flexible tape, for instance, resists the strains and stresses set up in the film when the tape is bent, and such strains and stresses do not rupture or break the film away from the steel or other flexible metal. The coating is flexible enough to withstand bending and strains without cracking on an arc of any radius in which a tape may be bent without breaking. The graduations of the scale may then be imprinted on the light reflecting surface in a contrasting color, say, one that is light absorbent, for instance, black, and numerals representing fractions of the units of measure may be imprinted thereon in the same color. The numerals representing the units of lineal measure may be imprinted in still another color, say, red, to contrast with both the background and the scale graduations. Superimposed upon the inner coating and the markings is an outer protective transparent coating bonded to the inner coating, through which the markings are clearly visible.

Another object of the invention is a method by which a wear-resisting finish of the character described may be applied to metal strips which will not be deleteriously affected by the constant flexing, say, of a tape. To this end, an opaque film of predetermined characteristics is caused to be bonded to the metal strip and the numerals and other indicia printed on the tape are protected by an overcoating of, for instance, a translucent or transparent film of such characteristics as do not produce any undesirable reaction between the two coatings.

These and other objects of the invention and the means for their attainment will be more apparent from the following detailed description taken in connection with the accompanying drawing, illustrating a preferred embodiment thereof, and in which:

Figure 1 is a view showing, in plan, a fragmentary portion of a measuring tape in accordance with this invention; and Figure 2 is a transverse sectional view taken in the plane indicated by the line 2—2 of Figure 1, looking in the direction of the arrows.

A strip of some suitable metal forming a tape is indicated at 5 in Figure 2. Superimposed upon all surfaces of the strip 5 is a ground coating 7 of some appropriate material, i. e., a pigmented film, such as enamel, which will form a firm bond with the metal, and which film, when dry, will retain a desired degree of flexibility. This coating completely surrounds the metal strip so that when the strip bends, it will conform thereto and be unaffected thereby.

The background formed by this ground coating is conveniently white in color and the scale graduations, both the unit graduations 9 and the fraction graduations 10, are imprinted thereon in a contrasting color, such as black.

In the illustrated embodiment, the scale is subdivided into markings representing feet and inches and the numerals representing inches are also imprinted in black, as at 11.

The units of lineal measure, in this instance, feet, are imprinted in still another contrasting color, say, red, as indicated at 13 and, in view of the fact that the background is of a contrasting color, smaller numerals 15, also may be imprinted in red along the scale between the large numerals 13, so that the reading in units and fractions may be readily made.

A top coating 8 of a clear transparent type is then applied over the facing and, in fact, completely surrounds the coating 7 so as to protect the printed graduations and the numbers and provide a wear-resisting finish.

While various types of coatings may be availed of for the purpose specified, it has been found desirable to use for the ground coat an opaque composition, for instance, an enamel or equivalent material having the capacity to bond with metal, say, steel. The surface of the strip 5 is first prepared by a suitable process to cause it to be more receptive to the coating. In the case of steel, this not only gives a rustproof finish to the surface of the steel, but also prepares the steel so that a subsequent finish, such as an enamel, will be able to firmly bond or adhere to the surface of the steel. Brass may, if desired, be given a well known cyanide treatment which causes the surface to be more receptive to the enamel and form a better bond therewith than untreated brass. In the preferred embodiment, as now practiced, a pigmented composition, such as enamel, preferably white, is applied to the prepared metal strip. This first coating we designate as the ground coat.

After the ground coat has dried, the indicia graduations 9 and 10 and numbers 13, 15 are then printed on the ground coat 7 by means of the transfer of a special printing ink from dies in such a way that the graduations formed on the tape may be the exact length. The ink, which we prefer to use, has the property of biting in and embedding itself in the ground coat and yet is not softened or attacked by the solvents of the top coating and thus the distortion and shifting of the graduations is prevented during manufacture. The printing dies force the ink forming the characters into the ground coat, to some extent at least. It is desirable that the indicia be embedded in the ground coat so that the surface of the ink markings and the surface of the ground coat lie in substantially one plane and present a smooth surface without projections formed by the ink of the impressions. Thus where the indicia are impressed by dies, decalcomania, etc., the ink may be permitted to dry to a predetermined degree, then preferably heated to a predetermined degree and then the imprinted tape subjected to pressure as by being passed between pressure rollers.

A top coating 8 of a clear transparent type is then applied over the facing comprised of the ground coat and indicia to protect the printed graduations and the numbers, and in this way a wear-resisting finish is applied to the tape.

It is preferred that the ground coat and the top coat have different characteristics so that the ground coat will not be affected by the solvent action of the top coating subsequently applied. Were a top coat of the same characteristic as the ground coat used, as, for instance, cellulose compositions, the top coat would exert its solvent action on the ground coat, causing the shifting of the printed graduations, thus causing the graduations to become wavy and actually affecting their accuracy.

For the ground coat, either of the following two types of materials is chosen:

(1) A synthetic type composition consisting of a phenol-formaldehyde and glyptal modification.

(2) A composition comprising cellulose esters and/or acetates.

If we use type No. 1 for the ground coat, we prefer to use type No. 2 for the top coat; or if we use type No. 2 for the ground coat, we use type No. 1 for the top coating. However, we have found it most practical to use type No. 1 as the ground coat and type No. 2 as the top coat. In either case, the ground coat is pigmented and the top coat is transparent. Both of the compositions have an elastic limit well within the elastic limit of steel. Thus we use finishing materials of a very flexible nature which will stand up under continuous flexing of the metal tape as, for instance, caused by the unwinding and rewinding of the tape in and out of its case during use. The finish also has perspiration resisting properties, that is, it is not affected by the action of the dializing organic acids commonly found in perspiration and transmitted to the tape by the hands of the user. The finish thus does not lose its property of adhesion to the steel nor does it break down under the severest handling.

By this process, we are enabled to choose a white ground coat which will not discolor with age and exposure to light and a top coating which is clear, transparent and colorless and permits the scale to be clearly visible therethrough.

The materials selected are adapted for application to the tape by various methods, such as by passing over a roller coating machine which coats one or both faces at a time, by spraying or by direct immersion and withdrawal from the bath. The latter method is preferred because both sides of the strip and the edges are covered simultaneously, thus forming a complete envelope or sleeve around the entire strip, not only when the first coat or ground coat is applied but also after the graduations and numbers are printed on the ground coat. Because of the fact that the solvents in the finishing material used for the top coat do not affect the ground coat or the ink used for the graduations and numbers, the top coat may also be applied by direct immersion and withdrawal. Preferably, also in the application of both coatings the tape is passed through the bath at such a slow rate of speed that the composition has time to set at the point of emergence.

Subsequent to each application of coating composition, the tape is permitted to dry for a period of time depending upon the characteristics of the composition.

With such materials of the character described as we are now familiar with, it has been found preferable to dry the coating of synthetic composition (type No. 1) by heating or baking the coated strip at approximately a temperature of 180° F. while the coating of cellulose derivative (type No. 2) will dry satisfactorily in the air, although, in the interest of rapid drying, this coating may also be dried at higher temperatures.

Such a composite coating of finishing materials as has been described not only protects the surface of the strip against oxidation but is, itself, not subject to corrosion or tarnishing and hence the contrasting color of the markings is always clearly visible thereon.

Various modifications will occur to those skilled in the art in the composition, disposition and contrasting colors of the background and markings, both scale and numerals, of this invention, as well as in the material of the metal to which it is applied and the use to which the finished product is put, and no limitation is intended by the phraseology of the foregoing description or illustrations in the accompanying drawing.

What is claimed is:

1. A measuring tape comprising a strip of metal, a coating of a finishing composition on a surface thereof forming a background, markings representing a scale imprinted on the background, and numerals representing at least units of lineal measure imprinted on said background, the respective colors of said background, markings and numerals being contrasting.

2. A measuring tape comprising a strip of metal, a ground coat on the surface thereof forming a background of a resin composition, graduations imprinted on said coat in a contrasting color, and a top coat of a cellulose derivative over the markings and ground coat which when applied comprised solvents which are non-solvents of the ground coat.

3. A measuring tape comprising a strip of metal, a ground coat on the surface thereof forming a background, graduations of a contrasting color imprinted on said coat with a composition adapted to bite in and embed itself in the ground coat and a top coat over the markings and ground coat which when applied comprised solvents, which are non-solvents of the ground coat or printing composition.

4. The method of making a coated metal tape which comprises applying to the metal strip a pigmented coating composition having a base of one solvent characteristic, applying graduations to the coated strip and applying a coating composition having a base of another solvent characteristic, whereby the application of the top coat will not affect the first coat.

5. The method of making a coated metal tape comprising applying a flexible ground coat of one solvent characteristic to the tape, printing graduations thereon with an ink having a property of biting in and embedding itself in the ground coat and applying a top coat having different solvent characteristics.

6. The method of making an enamel coated tape comprising passing a strip of metal through a bath of enamel having predetermined solvent properties, printing graduations thereon with an ink having a property of biting in and embedding itself in the said enamel and then passing the printed and coated strip through a bath of a transparent lacquer composition having predetermined and different solvent properties.

7. The method of making an enamel coated tape comprising immersing a strip in enamel, withdrawing the same, drying the coated tape, printing graduations thereon, subjecting the printed tape to pressure means to embed the printed impressions in the enamel coating, immersing the printed tape in a lacquer composition of a different solvent characteristic, withdrawing it and drying the tape.

8. The method of making a coated metal tape comprising applying a ground coat of one characteristic to the tape, printing graduations thereon, subjecting the printed tape to pressure means to embed the printed impressions in the enamel coating and applying a top coat of lacquer having different solvent characteristics.

9. A measuring tape comprising a strip of metal the surface of which has been treated to cause it to be receptive to a ground coat, a flexible pigmented ground coat applied to the receptive surface of the metal, graduations printed on said ground coat and a protective transparent top coat overlying the graduations and ground coat.

10. A measuring tape comprising a strip of metal the surface of which has been treated to cause it to be adherent to an enamel coating, a ground coat of flexible enamel applied to the surface of the steel tape, graduations printed thereon and a protective top coat superimposed on the graduations and ground coat.

11. A measuring tape comprising a strip of metal, a layer of enamel thereon having predetermined solvent properties, graduations thereon comprised of ink having a property of biting in and embedding itself in the enamel and a top coating of a transparent composition having predetermined and different solvent properties from that of the ground coat.

12. The method of making a coated metal tape which comprises applying to the metal strip a pigmented coating composition having a base of one solvent characteristic, applying graduations to the coated strip and applying a coating composition having a base of another solvent characteristic, in a solvent which will not cause the first coat to dissolve or blur with the graduations.

13. A highly legible graduated tape with distinct accurate graduations comprising a strip of metal, a pigmented first coat on said strip of metal, graduations printed in a contrasting color on said base coat and a top coat whose base has different solvent characteristics from the first coat covering said first coat and graduations.

14. A highly legible graduated metal measuring tape, having greater initial legibility under normal light conditions, more resistance to wear in use, higher resistance to corrosion and higher tensile strength than an etched tape made from the same metal base, comprising a flexible metal strip coated with a pigmented flexible base coating having contrasting colored graduations and numerals thereon.

15. A highly legible graduated metal measuring tape, having greater tensile strength, twisted tension strength and bending strength than an etched tape made from the same metal base comprising a flexible metal strip coated on both sides with a pigmented flexible base coating and having contrasting graduations thereon.

16. A highly legible graduated steel measuring tape which remains legible in use and resists corrosion comprising a steel strip rustproofed and coated with a pigmented flexible base coating having contrasting graduations thereon and an overcoat of a clear coating composition.

17. A measuring tape comprising a flexible strip of metal, a flexible coating of a pigmented finishing composition on a surface thereof forming a background, markings representing a scale imprinted on said background in a color contrasting therewith and numerals representing at least units of lineal measure imprinted on said background in a color contrasting with the background.

ADOLF W. KEUFFEL.
WALTER GOTHAM.